(12) United States Patent
Fujitsubo

(10) Patent No.: US 6,245,302 B1
(45) Date of Patent: Jun. 12, 2001

(54) CATALYTIC CONVERTER FOR PURIFYING GASES FROM AN INTERNAL COMBUSTION ENGINE

(75) Inventor: Isao Fujitsubo, Yokohama (JP)

(73) Assignee: Fujitsubo Giken Kogyo Company Limited, Yokahama (JP)

( * ) Notice: Subject to any disclaimer, the term of this patent is extended or adjusted under 35 U.S.C. 154(b) by 0 days.

(21) Appl. No.: 09/313,374

(22) Filed: May 18, 1999

(30) Foreign Application Priority Data

Nov. 2, 1998 (JP) .................................................. 10-325851

(51) Int. Cl.[7] .................................................. B01D 53/94
(52) U.S. Cl. ........................... 422/180; 422/177; 422/179
(58) Field of Search .................................. 422/171, 177, 422/179, 180; 502/439, 202, 240, 101, 207

(56) References Cited

U.S. PATENT DOCUMENTS 5,531,869 * 7/1996 Kubo ..................................... 502/202

FOREIGN PATENT DOCUMENTS 6-57264 * 3/1994 (JP) .
97/35099 * 9/1997 (WO) .

* cited by examiner

*Primary Examiner*—Hien Tran
(74) *Attorney, Agent, or Firm*—Staas & Halsey LLP

(57) ABSTRACT

A catalytic converter for purifying gases from a combustion engine using a catalyst comprising tourmaline is connected to a position more than 1 meter far from the exhaust manifold in an exhaust passage ranging from the exhaust manifold to the tail pipe. Coated on a monolithic carrier, the catalyst is prepared comprising tourmaline of 80~90 wt. % of said catalyst, or said tourmaline with platinum, palladium or rhodium of 0.1~0.5 grams per liter of said carrier. The catalyst comprising tourmaline, or said tourmaline with platinum, palladium or rhodium, or said tourmaline with the platinum, palladium and rhodium mixture is adjusted to amount to 10~30 wt. % of said carrier.

6 Claims, 3 Drawing Sheets

[FIG. 2]
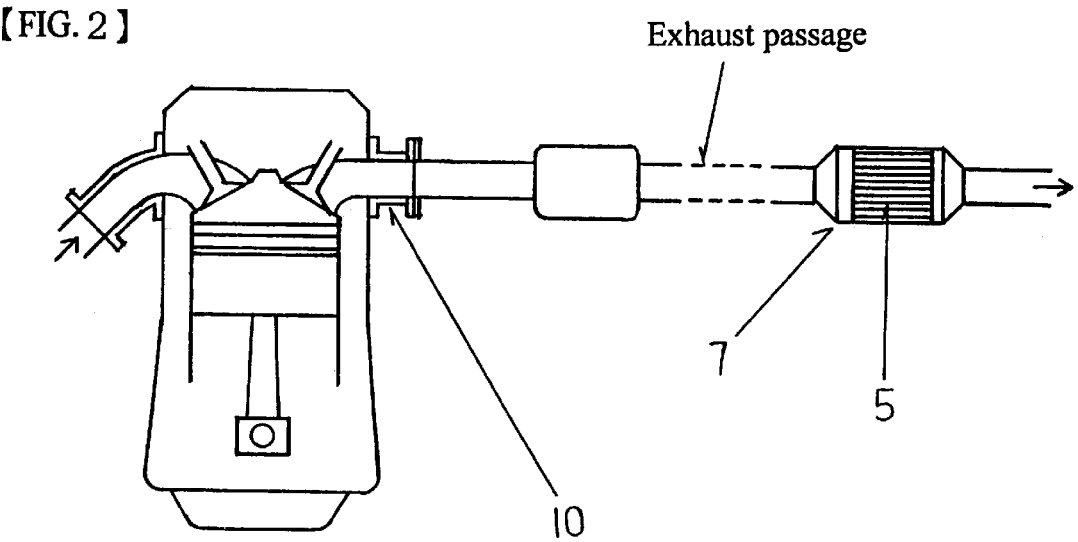
Exhaust passage
[FIG. 3]
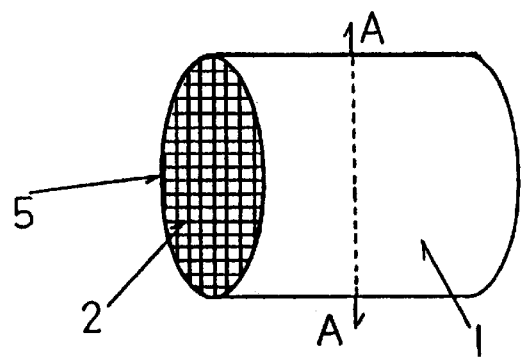

CATALYTIC CONVERTER FOR PURIFYING GASES FROM AN INTERNAL COMBUSTION ENGINE

BACKGROUND OF THE INVENTION

1. Field of the Invention

This invention relates to a catalytic converter for purifying gases using a catalyst with which to purify toxic exhaust gases from an internal combustion engine such as carbon monoxide, hydrocarbons and nitrogen oxides.

2. Description of the Prior Art

Heretofore, exhaust gas converters purifying exhaust gases from internal combustion engines have mostly been provided with a catalyst comprising a noble metal such as platinum, rhodium and palladium. Said catalyst functions to oxidize carbon monoxide and/or hydrocarbons contained in exhaust gases from said engines utilizing residual oxygen in said gases while reducing nitrogen oxides into monocular nitrogen by utilizing said exhaust gases as a reducing agent.

It is necessary in this case to keep said catalyst calcined over 300° C. so as to enhance catalysis. Hence, exhaust gas converters are generally positioned closer to an exhaust manifold, namely where a comparatively higher temperature remains in an exhaust passage, taking into account the co-efficient of the changing temperature of the engine and the target effect of exhaust gas purification.

As mentioned above, according to the prior art the major components of a catalyst comprise a noble metal such as platinum, rhodium and palladium in many instances. Said noble metal is so costly economically that it incurs a large social cost. Further, in view of the increasing consumption in the noble metal, depletion of such a natural resource has become the growing concern.

As indicated above, the catalytic exhaust gas converter utilizing the prior art has generally been so designed as to be positioned closer to an internal combustion engine in an exhaust passage with a view to improving the effect of converting exhaust gases. Or, some heating systems have been disclosed (Japanese Patent Publication Nos. 1993-163935 and 1996-93456) which are designed to electrically maintain a catalyst at a high temperature over 800° C. However, said converters have a disadvantage that such a high temperature affects the catalyst so that its aging is accelerated. Hence, it proves difficult to long maintain the purifying efficiency of the catalyst.

Without the development of a catalytic converter comprising such a catalyst whose gas purifying efficiency is least affected by a high temperature of exhaust gases, it would still be necessary despite its disadvantages to keep relying on the system either supported with a reheating device, or installed closer to an engine.

Further, heretofore, a catalytic converter for purifying exhaust gases installed in an exhaust passage has, as referred to earlier, been generally designed to enhance its purifying efficiency utilizing a high temperature of exhaust gases. The high temperature contributes, however, to increasing the emission resistance of exhaust gases, thus falling off an automotive engine power and lowering a gas mileage.

And, heretofore, platinum, palladium and rhodium have remained the principal components of catalysts used for a catalytic converter for purifying gases. Generally, more than 2 grams of such a noble metal are required for a 2-liter automobile. It is vitally important, required for a 2-liter automobile. It is vitally important, therefore, that given its limited supply a prosperity of related industries should be sustained by developing a catalyst comprising noble metals of less than 0.2 grams per an automobile, or one comprising alternative catalytic components.

BRIEF SUMMARY OF THE INVENTION

The converter of the present invention uses a catalyst comprising the particles of tourmaline as the major component, or in combination with platinum, palladium or rhodium, or in combination with the mixture of platinum, palladium and rhodium.

And further, the present invention is connected to a position more than 1 meter far from an exhaust manifold in an exhaust passage ranging from said manifold to the inlet of a tail pipe.

Accordingly, an object of the present invention is to develop a catalytic converter for purifying gases comprising such a catalyst that can effectively function even at a low temperature of below 800° C.

Another object of the present invention is to provide a catalytic converter purifying gases, which can be positioned more than one meter far from an internal combustion engine in an exhaust downstream with a view to improving the erect of purifying exhaust gases.

And another object of the present invention is to provide a catalytic converter purifying gases, which prevents the catalyst from an accelerated aging.

Yet another object of the present invention is to provide a catalytic converter purifying gases that need not be supported by any re-heating device.

Still a further object of the present invention is to provide a catalytic converter purifying gases that prevents an automotive engine power or a gas mileage from falling off.

And, another object of the present invention is to reduce demand for noble metals such as platinum, palladium and rhodium.

BRIEF DESCRIPTION OF THE DRAWINGS

FIG. 2 is a diagram showing where to position a catalytic converter for purifying gases of this invention in an exhaust passage, FIG. 3 is a side perspective view of a monolithic carrier made from cordierite ceramics;

DETAILED DESCRIPTION

As illustrated in FIG. 1 to FIG. 6, a catalyst used for the catalytic converter of the present invention is provided with the monolithic carrier 1 coated thereon by the particles of tourmaline in the manner that their film 3 is uniformly dispersed all over the surface area of both the monolithic carrier 1 of cordierite ceramics and its ribs 2. Tourmaline is thus coated on the monolithic carrier 1 with support of a binder by impregnation and thermal drying methods. In this case said monolithic carrier 1 is shaped in a cylinder of 1.6 liters with 300 cells per $in^2$.

Figure 1:
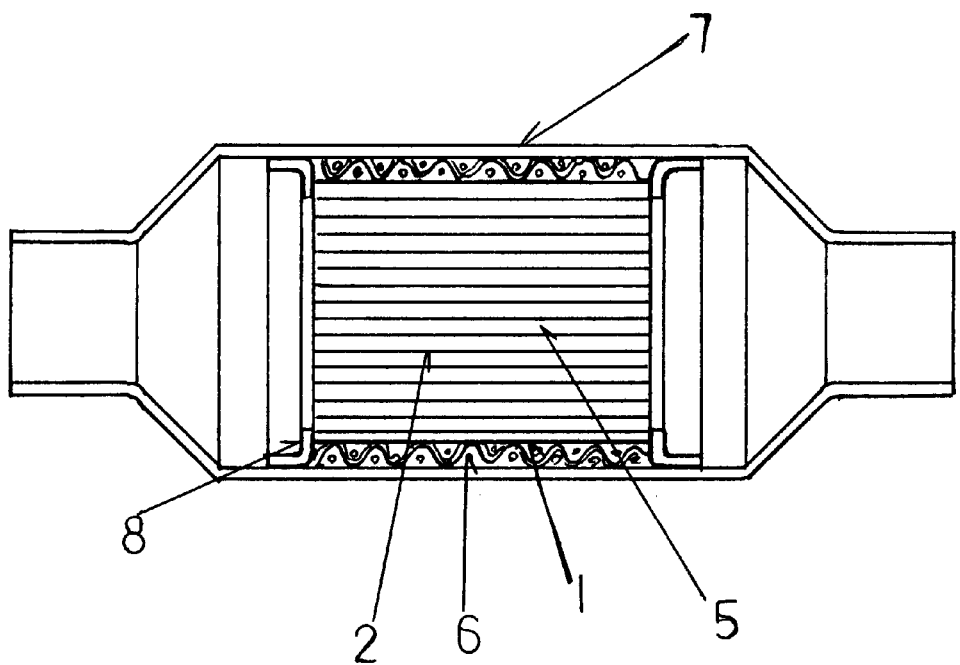
FIG. 1 is a sectional side elevation of a catalytic converter for purifying gases of this invention.
Figure 4:
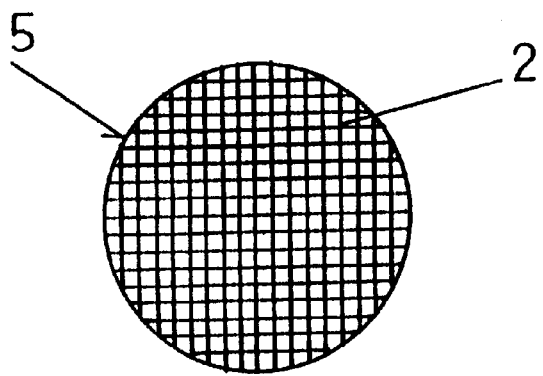
FIG. 4 is a sectional view of the A—A portion of FIG. 3.
Figure 5:
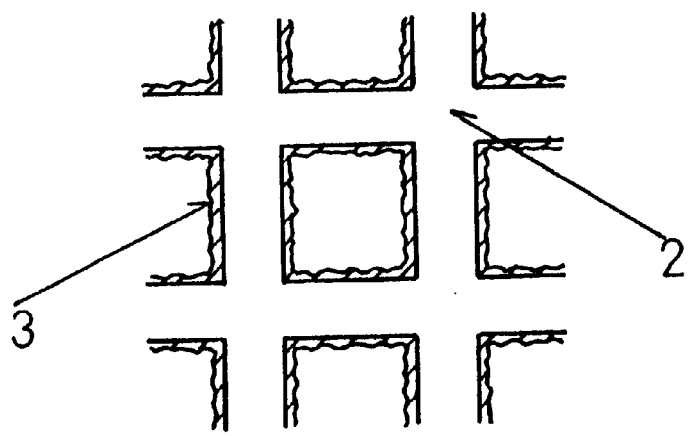
FIG. 5 is an enlarged detail showing an embodiment of the coating of a carrier as illustrated in FIG. 4.
Figure 6:
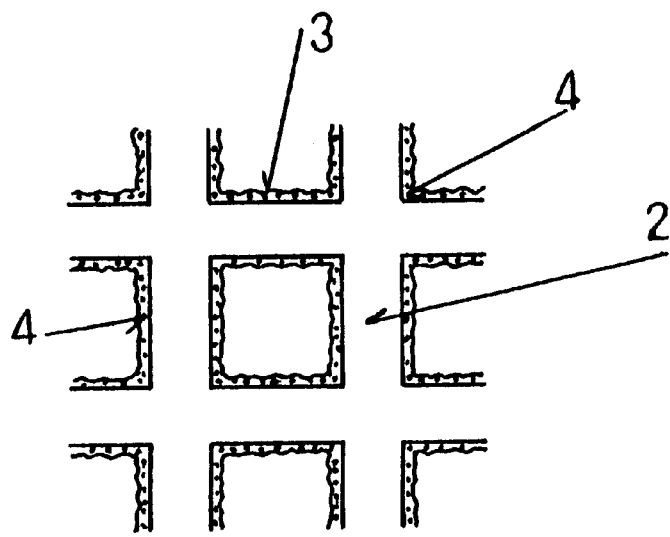
FIG. 6 is an enlarged detail showing another embodiment of the coating of a carrier as illustrated FIG. 4.

Referring to FIG. 1, the catalyst 5 is firmly secured in the refractory casing 7 made of stainless steel with support of the cushioning layer 6 and the stopper 8. Said cushioning layer 6 is preferably made of either a refractory steel wool or mesh fabric, or a heat expansion mat of ceramic fiber.

The catalytic converter of the present invention can, as illustrated in FIG. 2, be connected to any position more than 1 meter far from the exhaust manifold 10 in an exhaust passage ranging from said manifold 10 to the inlet of a tail pipe.

Referring further to FIG. 1 to FIG. 6, the methods of preparing the catalysts used for the present invention are set forth in the examples below.

EXAMPLE 1

A catalyst used for the catalytic converter of the present invention is provided with the monolithic carrier 1 coated thereon by the particles of tourmaline of 80~90wt. % of said catalyst. Tourmaline is coated on the monolithic carrier 1 with support of a binder by impregnation and thermal drying methods.

In this example, the catalyst comprising the particles of tourmaline of 80~90 wt. % of said catalyst is prepared by mixing both 600 grams of the particles of tourmaline and 150 grams of gamma aluminum gel, and stirring them in water so as to obtain a uniform composition of the mixture. Then, a modicum of nitrite acid is added so that said mixture is transformed into a slurry of pH 5.0~6.0.

The monolithic carrier 1 is impregnated a few minutes in said slurry heated at a temperature of 40° C. Then, the residual slurry adhered to the surface area of the ribs 2 is removed by blowing compressed air (pressure 5 kg/cm$^2$). Said monolithic carrier 1 is first dried at a temperature of 120° C. for two hours, and further calcined at a temperature of 450° C. for 4 hours.

Consequently, the surface area of both the carrier 1 and the ribs 2 is sufficiently coated with catalytic particles to form the film 3 thereon. In this manner, said surface area of the monolithic carrier 1 and the ribs 2 is repeatedly coated with catalytic particles as illustrated in FIG. 3 so that the particles forming the film 3 thereon can be adjusted to amount to 10~30 wt. % of the monolithic carrier 1.

By such a method it is possible to deposit on the surface area of the monolithic carrier 1 of cordierite ceramics and the ribs 2 the particles of tourmaline of 80~95 wt. % of the catalyst so that the film 3 can be formed within the range from 0.05 mm to 0.2 mm thick.

In the meantime, carbon monoxide, hydrocarbons and nitrogen oxides produced from incomplete combustion are cooled off below 800° C. in an exhaust passage and passed in contact with the catalyst 5 firmly secured in the refractory casing 7 of the converter that is positioned more than 1 meter far from the exhaust manifold 10 in said exhaust passage.

As generally known, it is characteristic of tourmaline being the major component of the catalyst 5 to generate polarity in its crystal lattices even below 800° C. Thus, polarization is generated in the film 3 of tourmaline. It follows that the polarization potential functions to enhance the ionizing and exciting abilities of nearby molecules so as to easily oxidize and reduce exhaust gases and effectively purify pollutants in hot gases. Hence, without the purifying efficiency of catalyst 5 falling off the catalytic converter of the present invention can be connected to any position more than 1 meter far from the exhaust manifold 10 in an exhaust passage ranging from said manifold 10 to the inlet of a tail pipe.

The example 1 of the present invention using the catalyst 5 comprising the particles of tourmaline reveals the effects of converting exhaust gases as shown in Table 1 below in comparison with an example of the prior art.

EXAMPLE 2

A catalyst that differs in composition from such as set forth above is provided as another example of the present invention. Namely, the catalyst is prepared by coating on the carrier 1 the particles of tourmaline of 80~90 wt. % of said catalyst in combination with platinum, palladium or rhodium of 0.1~0.5 grams per liter of said carrier.

The catalyst comprising platinum in combination with tourmaline is prepared impregnating it in the water solution of an oxide of platinum chloride containing 0.2 grams of platinum. It is dried at a temperature of 120° C. for two hours: Then the oxide of platinum chloride is dissolved at a temperature of 550° C.

In case either rhodium and/or palladium are employed in place of, or with, platinum, the water solution of rhodium chloride and/or palladium chloride are employed in place of, or with, said oxide of platinum chloride.

In any event, it is preferable that the water solution of oxide of platinum chloride, or rhodium chloride and/or palladium chloride is sufficient to wholly impregnate the monolithic carrier 1.

In this example, platinum, palladium and/or rhodium 4 as dispersed uniformly within the film 3 of said catalyst 5 are passed in contact with said polarity being generated in tourmaline as set forth in Example 1. Then, affected by said polarization potential the atoms of said noble metals are equally excited through a transfer reaction of the electrons so that oxidization and reduction reactions are enhanced. In such a manner, the gas purification effect of the present invention proves notably improved as evidenced in Tables 1 and 2 below.

The catalytic converter of the present invention may be connected to any position more than 1 meter far from the exhaust manifold 10 in an exhaust passage ranging from said manifold to the inlet of a tail pipe.

The following table shows the effects of converting exhaust gases in the application of the catalytic converter of the present invention for gasoline engines.

TABLE 1

| Gas component (PPM) | Example 1 | Example 2 | Comparative example |
| --- | --- | --- | --- |
| Carbon monoxide | 165 | 110 | 280 |
| Hydrocarbons | 200 | 95 | 360 |
| Nitrogen oxide | 510 | 400 | 780 |

The following table shows the effects of converting exhaust gases in the application of the catalytic converter of the present invention for diesel engines.

TABLE 2

| Gas component (PPM) | Example 1 | Example 2 | Comparative example |
| --- | --- | --- | --- |
| Carbon monoxide | 40 | 25 | 60 |
| Hydrocarbons | 43 | 30 | 120 |
| Nitrogen oxide | 680 | 600 | 1,100 |

The catalytic converter of the present invention uses a catalyst comprising mostly tourmaline. Hence, a polarized electrode is generated in the film of tourmaline particles, whose potential, as such, functions to activate the ionizing and exciting of nearby molecules, while considerably enhancing oxidization and reduction of hot gases at a temperature below 800° C.

With the effect of notably activating exhaust gas conversion as shown in Tables 1 and 2, the present invention enables the converter to be connected to a position more than 1 meter far from an exhaust manifold in an exhaust passage.

Further, said system, though used a long time, suffers least from an accelerated aging of the purification efficiency which would otherwise occur at a high temperature over 800° C.

What is claimed is:

1. A catalytic converter from purifying gases from an internal combustion engine comprising:
    a monolithic carrier; and
    a catalyst coated on the monolithic carrier, the catalyst comprising 80~90 wt. % particles of tourmaline.

2. The catalytic converter as set forth in claim 1 further comprising platinum, palladium or rhodium in an amount equal to 0.1~0.5 grams per liter of the monolithic carrier.

3. The catalytic converter as set forth in claim 1 further comprising a mixture of platinum, palladium and rhodium in an amount equal to 0.1~0.5 grams per liter of the monolithic carrier.

4. An exhaust system for purifying gases from an internal combustion engine, comprising:
    an exhaust passage extending from an exhaust manifold to an inlet of a tail pipe; and
    a catalytic converter located within the exhaust passage at a location more than one meter away from the exhaust manifold, the catalytic converter comprising:
    a monolithic carrier; and
    a catalyst coated on a monolithic carrier, the catalyst comprising 80~90 wt. % particles of tourmaline.

5. The exhaust system as set forth in claim 4, wherein the catalytic converter further comprises platinum, palladium or rhodium in an amount equal to 0.1~0.5 grams per liter of the monolithic carrier.

6. The exhaust system as set forth in claim 4, wherein the catalytic converter further comprises a mixture of platinum, palladium and rhodium in an amount equal to 0.1~05 grams per liter of the monolithic carrier.

* * * * *

UNITED STATES PATENT AND TRADEMARK OFFICE
CERTIFICATE OF CORRECTION

PATENT NO.     : 6,245,302 B1
DATED          : June 12, 2001
INVENTOR(S)    : Isao Fujitsubo It is certified that error appears in the above-identified patent and that said Letters Patent is hereby corrected as shown below:

<u>Title page,</u>
Item [73], change "Yokahama" to -- Yokohama --.

<u>Column 5,</u>
Line 13, insert -- , -- after "engine".

<u>Column 6,</u>
Line 20, change "05" to -- 0.5 -- to conform with other claims.

Signed and Sealed this

Fifth Day of February, 2002

Attest:

Attesting Officer

JAMES E. ROGAN
*Director of the United States Patent and Trademark Office*